INVENTOR.
JAMES R. VERWEY
BY [signature]
ATTORNEY

July 18, 1967

J. R. VERWEY 3,332,080

BEARING COMPUTER FOR USE IN ELECTRONIC
NAVIGATION SYSTEMS, SUCH AS TACAN

Filed Sept. 29, 1965

INVENTOR.
JAMES R. VERWEY

BY

ATTORNEY

United States Patent Office 3,332,080
Patented July 18, 1967

3,332,080
BEARING COMPUTER FOR USE IN ELECTRONIC NAVIGATION SYSTEMS, SUCH AS TACAN
James R. Verwey, Rochester, N.Y., assignor to General Dynamics Corporation, a corporation of Delaware
Filed Sept. 29, 1965, Ser. No. 491,218
21 Claims. (Cl. 343—106)

ABSTRACT OF THE DISCLOSURE

A bearing computer for use in TACAN systems is described. The computer may be located in an aircraft and is cooperative with a receiver which receives reference signals and harmonically related (135 c./s. and 15 c./s.) bearing signals from a beacon. The computer includes a variable frequency oscillator, phase locked to the 135 c./s. signals, which produces clock pulses at a much high frequency than 135 c./s. The clock pulses are counted in a counter under the control of the received reference signals and pulses corresponding to the 135 c./s. and 15 c./s. signals. A logic system controls the counter so that it counts pulses between the time of occurrence of the reference pulses and the 135 c./s. pulses which follow the reference pulses. After each dwell the counter is read out and the bearing is displayed.

---

Figure 1:
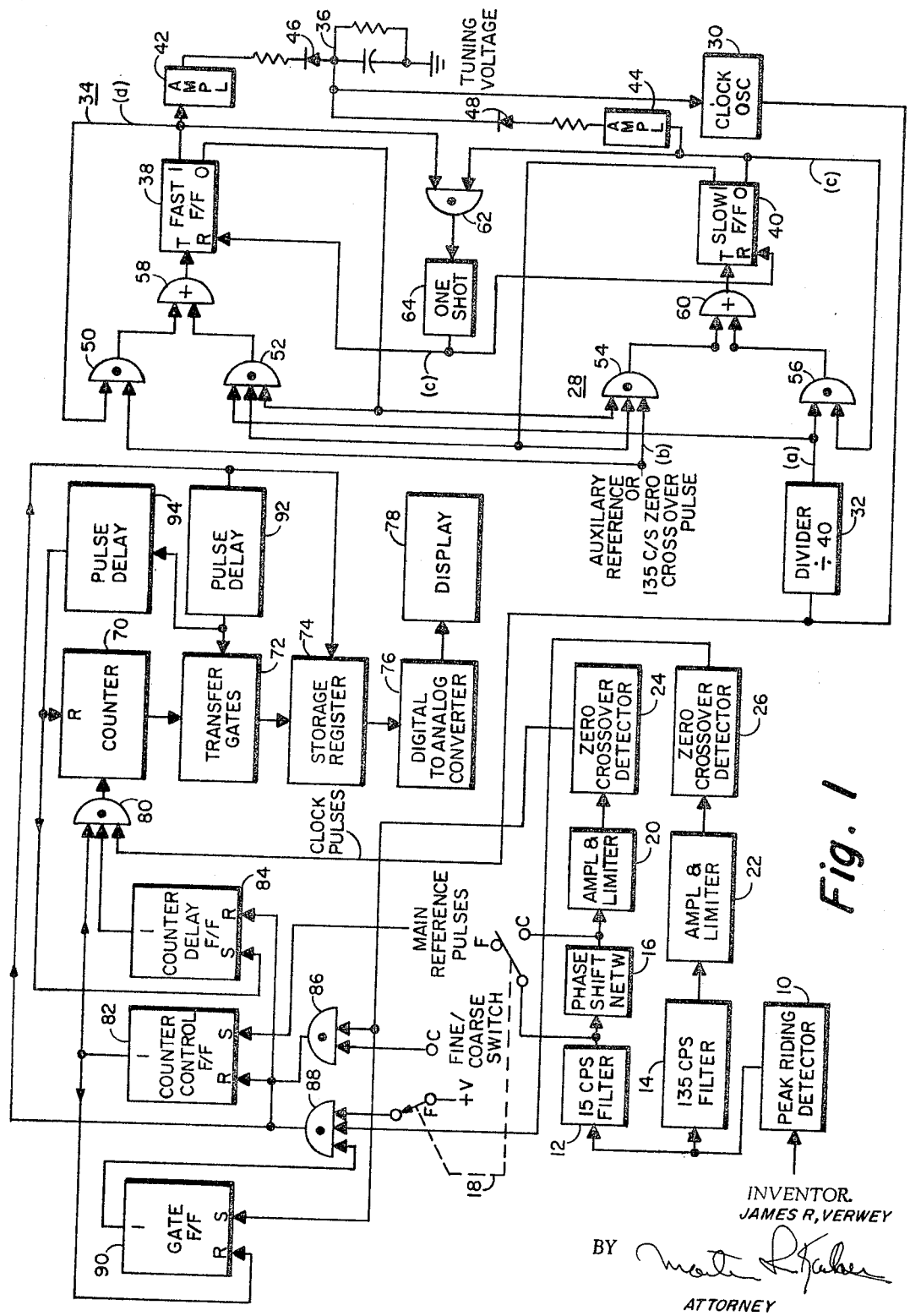

The present invention relates to computer systems and particularly to a system for computing the bearing of a receiving station with respect to a transmitting station.

The invention is especially suitable for use in TACAN systems wherein a beacon transmits a complex signal including a reference pulse, a fundamental wave and a harmonic wave, which is received at a receiving station. The receiving station is usually located in an aircraft. The relationship between the reference pulse and the fundamental wave at the receiving station is such that the electrical phase angle between the reference pulse and the received fundamental wave is a function of the bearing of the receiving station with respect to the beacon. Since the harmonic wave repeats itself several times for each cycle of the fundamental wave, the electrical phase of the harmonic wave is a function of the bearing to a higher degree of accuracy than the fundamental wave.

In present TACAN systems auxiliary reference pulses are also included in the complex signal which is transmitted by the beacon. Electro-mechanical or analog bearing computers have been used which include servo systems responsive to the phase angle between the first mentioned, or main, reference pulses and the fundamental wave and between the auxiliary pulses and the harmonic waves for driving a motor to position a shaft so as to indicate the bearing. The analog computation is made in two steps. First, the phase difference between the fundamental wave and the main reference pulse is used to roughly position the shaft of the indicator. Then the phase difference between the auxiliary reference pulse and the harmonic wave is used to position the shaft more precisely. Mechanical devices are used in both steps of the analog computation process. These devices are slow acting and limit the accuracy of the measurement. Moreover, these devices are subject to wear and mechanical failure, particularly in the extreme environmental conditions which may be experienced in aircraft.

It is an object of the present invention to provide an improved system for computing bearing, in which the drawbacks and disadvantages of known systems are substantially eliminated.

It is a further object of the present invention to provide an improved system for computing bearing with respect to a transmitting station which transmits signals representing the bearing, which system operates in accordance with digital handling processes.

It is a still further object of the present invention to provide a digital system for computing bearing between a transmitting beacon and a receiving station which receives signals from that beacon, the bearing being computed to a higher degree of accuracy than is the case with known computers.

It is a still further object of the present invention to provide a digital bearing computer which is adapted to use microelectronic circuitry and which can be made small in size so as to occupy a limited amount of space.

Briefly described, a system for computing bearing in accordance with the invention may be located at a receiving station which receives signals from a transmitting station, the phase relation between which signals, at the receiving station, is a function of the bearing of the receiving station with respect to the transmitting station. Detection circuits are provided at the receiving station which produce, in response to the received signals, signal pulses corresponding to different ones of the received signals. These signal pulses occur repetitively at the same position in the cycle of their corresponding signals. A source of clock pulses is also provided at the receiving station. A counter is controlled by the signal pulses for providing outputs corresponding to the number of clock pulses which occur during intervals starting with one of the signal pulses and ending with the other thereof. In the event that the transmitting station effects the reception of a reference pulse and signal pulses corresponding to a fundamental wave and a harmonic wave, the number of clock pulses counted is a measure of the time interval between the reference pulse and the signal pulse corresponding to the harmonic which immediately succeeds the signal pulse corresponding to the fundamental which follows the reference pulse.

Bearing indicating means may be provided which indicates the bearing as a function of the number obtained from the counter. Since this number may be updated after each repetition of the reference pulse, the bearing is continuously updated. The accuracy of the indication is also high since a large number of clock pulses, say ten, may be generated for each degree of bearing which is to be measured. Also, digital circuitry, such as may be in microelectronic form, may be used to process the information contained in the signals. These circuits are more reliable and occupy a smaller amount of space than analog systems such as the servo motor control systems which have been used in prior bearing computers.

Figure 2:
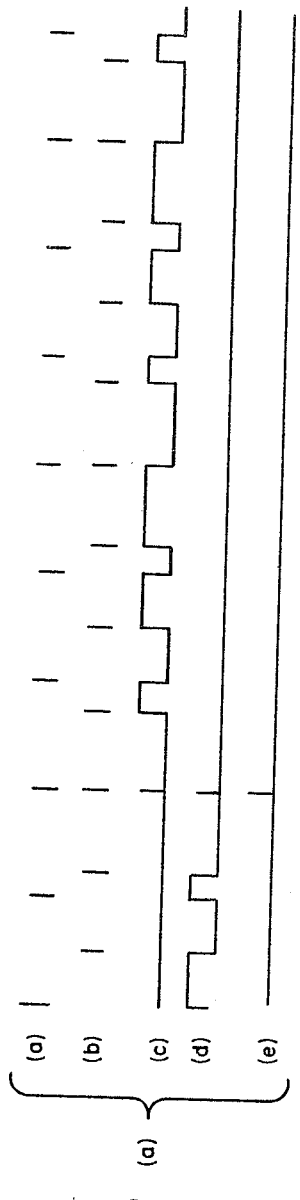
Figure 2:
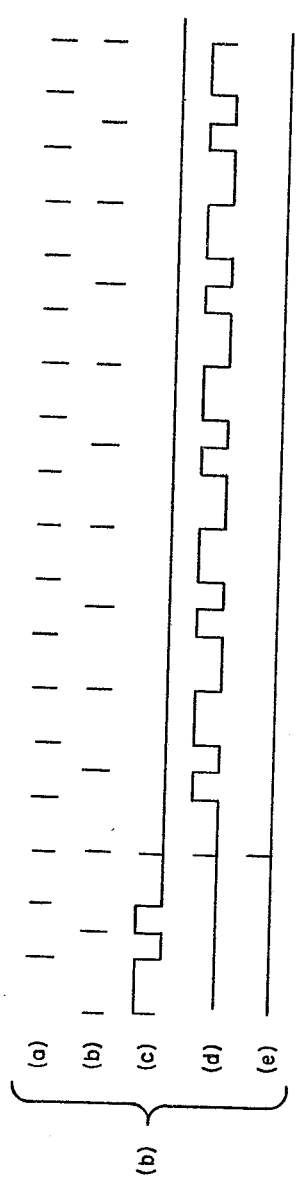
Figure 2:
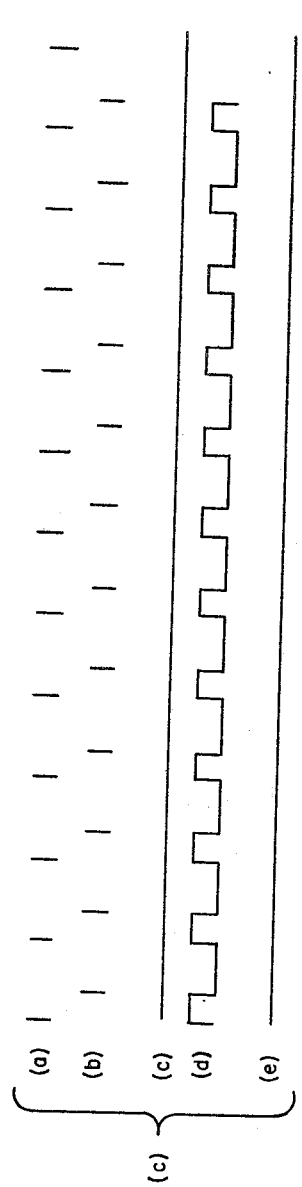

The invention itself, both as to its organization and method of operation, as well as additional objects and advantages thereof will become more readily apparent from a reading of the following description in connection with the accompanying drawings in which:

FIG. 1 is a block diagram of a bearing computer system embodying the invention; and FIGS. 2(a) through 2(c) inclusive, are waveform diagrams of pulses which are produced in the system of FIG. 1.

Referring more particularly to FIG. 1, there is shown a peak riding detector 10 of the type used in TACAN systems which responds to the video signal derived from the receiving circuits of a TACAN receiver. This peak riding detector derives the fundamental and the harmonic waves which are received by the receiver from the TACAN beacon. The fundamental wave has a frequency of 15 c./s. and the harmonic wave has a frequency of 135 c./s. The video signal is also applied to a reference burst decoder, which may be of the type used in TACAN sets, and which derives the main reference pulse which is also used in the illustrated computer system.

A 15 c./s. filter 12 and a 135 c./s. filter 14 to which the output of the peak riding detector 10 are applied separately extract the 15 c./s. wave and the 135 c./s. wave. These filters also effectively produce a wave based on the average phase of the received 15 c./s. and 135 c./s. waves since they remove some of the jitter which may be present in these received waves.

A phase shift network 16 which is bridged by a short circuiting switch 18, indicated as a fine/coarse switch, is coupled to the output of the 15 c./s. filter. This network is a phase advanced network of the type known in the art and is designed to advance the phase of the 15 c./s. wave approximately twenty degrees. The phase shift network 16 is used in order to counteract the adverse effects of a possible error in the phase of the signals received from the beacon. This error may be due to various causes, such as distortion in the beacon pattern which might cause a displacement between the 15 c./s. modulation and the 135 c./s. modulation. So long as this error is less than the equivalent of twenty degrees of bearing, the computer system is insensitive thereto. This is because the proper 135 c./s. wave then is capable of providing the information respecting the bearing, as will be more fully apparent as the description proceeds. In lieu of the phase shift network being coupled to the output of the 15 c./s. wave 12, the 135 c./s. wave from the filter 14 may be effectively shifted in phase, 180°, say, by phase reversal thereof so as to provide an effective phase advance of 20° of bearing. Combinations of phase shift of the 15 c./s. wave and the 135 c./s. wave may, of course, be utilized. However, it is preferred to use a phase shift network 16 as shown FIG. 1, inasmuch as corrections in the output of the computer to correct for phase shift as would be necessary if the 135 c./s. wave were shifted in phase, are not required.

An amplifier and limiter 20 is used to shape the 15 c./s. wave, and a similar amplifier and limited 22 is used to shape the 135 c./s. wave. A zero cross-over detector 24 receives the amplified and limited 15 c./s. wave and provides a signal pulse at the zero cross-over thereof. This cross-over detector may include differentiating and clipping networks which respond solely to the leading edge of the limiting wave from the output of the amplifier and limiter 20. Since the design of such a detector is known in the art, it is not described in detail herein. A similar zero cross-over detector 26 is used to provide a signal pulse at the zero cross-over of the 135 c./s. waves. It will be noted that the detectors 24 and 26 provide signal pulses at like phase positions in the cycle of the waves which are respectively applied thereto.

These signal pulses corresponding to the 15 c./s. waves and the 135 c./s. waves and the main reference pulse are applied together with the clock pulses to the computing circuits of the system. It may be desirable to utilize auxiliary reference pulses pulses which are derived from the auxiliary reference burst detector of the TACAN receiver for the purpose of reducing any error in the time of reception of the main reference pulses, as might be introduced by distortion of the beacon pattern. For example, the received main reference pulse may be used to control a gate to select one of the auxiliary reference pulses for use as a synthetic main reference pulse. In the latter case it is desirable to generate nine auxiliary reference pulses based upon the average time position of the eight reference pulses which are derived by the auxiliary reference burst detector and to gate out as the synthetic main reference pulse one of these nine auxiliary reference pulses. The generated nine auxiliary reference pulses may be produced from an oscillator, the phase and frequency of which are controlled by the eight auxiliary reference pulses from the burst detector.

The clock pulses are provided by a clock pulse source 28 which provides clock pulses at a frequency which is a higher harmonic of the 135 c./s. signal pulses and which are locked both in phase and frequency therewith. A phase and frequency locking loop is used to control the generation of the clock pulses. This loop includes a clock oscillator 30 which may be a voltage controlled multivibrator. The output frequency of this oscillator is nominally 54,000 c./s. Since voltage controlled oscillators of this type are known in the art, it is not described in detail herein. The phase locked loop also includes a frequency divider which may be a chain of flip-flops for dividing the output of the oscillator by 400 so as to provide pulses having a repetition rate of approximately 135 c./s. The phase of these pulses is compared to the phase of the 135 c./s. signal pulses from the zero cross-over detector or to the phase of auxiliary pulses. When the 135 c./s. signal pulses are referred to hereinafter, this reference will be understood to include the auxiliary reference pulses when these pulses are utilized for automatic frequency and phase control of the clock oscillator 30.

The automatic frequency control system is provided by a frequency and phase detector 34. The output of this frequency and phase detector is a direct current voltage which varies in amplitude and sense in accordance with the sense and magnitude of the phase and frequency deviation of the output of the clock oscillator with respect to the 135 c./s. signal pulses. This error voltage is filtered by means of an RC filter circuit 36 and applied to tune the clock oscillator 30.

The frequency and phase detector includes a flip-flop 38, indicated as the fast flip-flop, which is set during the time interval between the divider 32 output pulses and the 135 c./s. pulses if the divider pulses occur at a faster rate than the 135 c./s. pulses. A flip-flop 40, indicated as the slow flip-flop, is set during the time interval between the 135 c./s. pulses and the divider pulses if the 135 c./s. pulses occur at a faster rate than the divider pulses. The sense of the phase difference between the 135 c./s. pulses and the divider pulses is indicated by which flip-flop—38 or 40—is set, and the magnitude of the phase difference is indicated by the length of time that one or the other of these flip-flops is set. The set output of the flip-flop is therefore a series of pulses which are amplified by the amplifier, 42, in the case of the fast flip-flop 38, and the amplifier 44, in the case of the slow flip-flop 40. These may be direct current amplifiers. The outputs of these amplifiers are rectified by diodes 46 and 48. The diodes are polarized so that when the fast flip-flop is set, the filter circuit 36 is charged negatively, while when the slow flip-flop is set, the filter circuit 36 is charged positively. A positive voltage is therefore applied to the clock oscillator when the 135 c./s. pulses occur at a faster rate than the divider pulses (i.e., the clock is slow) and a negative error voltage is applied to the oscillator 30 when the 135 c./s. pulses occur at a slower rate than the divider pulses (i.e., the clock is fast). A positive voltage, therefore, tends to increase the frequency of the clock, and the negative voltage tends to reduce the frequency of the clock. These voltages are also provided when the clock is out of phase with the 135 c./s. voltage. Accordingly, the clock oscillator is locked both in frequency and in phase.

A logic circuit, including AND gates 50, 52, 54 and 56 and OR gates 58 and 60, controls the fast and slow flip-flops 38 and 40 in accordance with the frequency and phase of the 135 c./s. pulses and the divided clock pulses so as to set and reset the flip-flops.

In addition, an AND gate 62 is provided which detects the simultaneous occurrence of the 135 c./s. pulses and the divided pulses and is enabled in response thereto. This AND gate operates a one-shot multivibrator 64 which resets both the fast and slow flip-flops. To designate the gates the convention of a dot (·) for an AND gate and a plus (+) for an OR gate is used.

The operation of the frequency and phase detector 34 will be more clearly understood in connection with FIGS. 2(a) through 2(c). Consider the initial condition in which the divided clock pulses occur first, but with a lower repetition rate than the 135 c./s. pulses. The divided clock pulses (indicated at a in FIGS. 1 and 2(a)) are applied through the AND gate 52 to OR gate 58 and trigger the fast flip-flop 38. The AND gate 52 is enabled since both flip-flops 38 and 40 are are assumed initially to be reset. The next-occurring 135 c./s pulse (indicated at b in FIGS. 1 and 2(a)) is assumed to occur after the divider pulse and triggers the fast flip-flop 38 so that the fast flip-flop is turned off, since the AND gate 50 to which the 135 c./s. pulse is applied is enabled. The AND gate 54 is inhibited by the "0" output of the fast flip-flop 38 upon occurrence of the first 135 c./s. pulse and does not permit the 135 c./s. pulse to turn the slow flip-flop on.

A similar sequence of events follows upon occurrence of the second divider pulse and the second 135 c./s. pulse, and the "1" output of the fast flip-flop provides a second pulse. When the 135 c./s. pulse overtakes the divider pulse, the 135 c./s. and the divider pulses become coincident with each other. These coincident pulses both are passed by the enabled AND gates 52 and 54 and briefly set the fast and slow flip-flops. The simultaneous setting of these flip-flops provides outputs to the AND gate 62 which triggers the one-shot 64 and quickly resets the flip-flops. Since the 135 c./s. pulses are occurring at a more rapid rate than the divider pulses, the 135 c./s. pulses soon begin to precede the divider pulses. The fourth 135 c./s. pulse then is passed by the enabled AND gate 54 and sets the slow flip-flop 40. The slow flip-flop 40 is reset by the next-occurring or fourth divider pulse, and an output pulse is provided at the "1" output c of the slow flip-flop 40. These slow flip-flop output pulses are continually generated so long as the 135 c./s. pulses precede or occur simultaneously with the divider pulses. The "1" output c of the slow flip-flop is amplified and provides a positive error voltage for tuning the oscillator.

A similar sequence of events occurs when the divider pulses have a greater (faster) repetiton rate than the 135 c./s. pulses, as will be observed from FIG. 2(b) of the drawing.

When the divider pulses and the 135 c./s. pulses have the same frequency as each other, an output voltage will be produced depending upon the phase difference therebetween. As the phase difference is reduced, the error voltage becomes smaller and smaller. At lock in, there will be a series of short pulses produced both from the output of the slow-flip-flop and from the output of the fast flip-flop. The average value of these output pulses controls the clock oscillator. Accordingly, the clock oscillator is then locked in frequency and phase.

Since the 135 c./s. pulses vary in accordance with the speed of rotation of the beacon antenna, it will be observed that the clock oscillator is also locked in frequency and phase to the frequency of the antenna rotation. The accuracy of the bearing measurement is therefore very high and substantially unaffected by variations in antenna rotation speeds.

A counter 70 is provided to count the clock pulses under the control of the main reference pulses, the 15 c./s. pulses and the 135 c./s. pulses. This counter may include fourteen flip-flops and may count up to 3600 inasmuch as 3600 pulses may be counted during one cycle rotation of the beacon antenna (which rotates at 15 c./s.). Transfer gates 72 are provided for transferring the output of the stages of the counter in parallel to corresponding stages of a storage register 74 at such time as the transfer gates are enabled. This storage register applies its output to a digital-to-analog converter 76 which translates the digital number stored therein to an analog voltage which may operate an indicator display of the type used in TACAN systems. This display is generally mounted in the cockpit of a TACAN equipped aircraft.

The counter 70, the transfer gates 72 and the storage register 74 are controlled by the main reference, 135 c./s. and 15 c./s. pulses when the system is conditioned for fine operation, as by placing the fine-coarse switch 18 in the position shown in the drawing. When the fine/coarse switch is placed in the coarse position, only the 15 c./s. pulses are used. Also, the phase shift network 16 is shortcircuited to prevent introduction of error in measurement.

The control logic arrangement which is operated by these pulses includes an AND gate 80 which applies the clock pulses to the counter 70 when enabled. This AND gate is enabled when a counter control flip-flop 82 and a counter delay flip-flop 84 are both set. The counter control flip-flop 82 is set by the main reference pulses and is reset by the 15 c./s. pulses which are applied thereto through an AND gate 86, when the system is conditioned for coarse operation or by an AND gate 88, when the system is conditioned for fine operation.

The AND gate 86 is enabled by a source of operating voltage indicated as +V when the switch 18 is set to the coarse position. The AND gate 88 is enabled by the source +V when the switch is in the fine position. The AND gate 88, however, is not enabled until a gate flip-flop 90 is set. This gate flip-flop 90 is set by the 15 c./s. pulses and is reset by the counter control flip-flop 82 when the counter control flip-flop is set.

The 135 c./s. or 15 c./s. pulses also are applied to the storage register 74 for resetting that register upon occurrence thereof. A first pulse delay device such as a one-short multivibrator 92 is also operated by the 135 c./s. or 15 c./s. pulse which is transmitted by the AND gates 88 or 86 and enables the transfer gates a short time, say one microsecond, after the storage register 74 is reset. Accordingly, the count stored in the counter may then be transferred to the register. Another pulse delay device 94, such as another one-shot multivibrator, is coupled to the output of the first pulse delay 92, and serves to reset both the counter 70 and the counter delay flip-flop 84 after an additional delay period, say another one microsecond. The counter may then receive a count during the next cycle of the beacon antenna.

When the system is conditioned for fine operation, the main reference pulse occurs first during a cycle and sets the counter control flip-flop 82. The counter delay flip-flop 84 is also set at the end of the previous cycle. Accordingly, the AND gate 80 is enabled, and clock pulses are applied to the counter. The 15 c./s. pulse next succeeding the main reference pulse then occurs. This pulse effectively selects the 135 c./s. pulse which is used in the bearing computation. The selection is made by the setting of the gate flip-flop 90 and enabling of the AND gate 88. The 135 c./s pulse which immediately succeeds the 15 c./s. pulse is then transmitted by the gate 88 and resets the counter control flip-flop 82 and the counter delay flip-flop 84, thereby inhibiting the AND gate 80 and stopping the counter. The 135 c./s. pulse also resets the storage register. After a delay in the pulse delay device 92, the transfer gates 72 are enabled, and the count is transferred to the storage register 74. After another delay in the one-shot multivibrator 94, the counter 70 is reset, and the counter delay flip-flop 84 is reset.

The counter delay flip-flop counteracts erroneous counts when the bearing is near zero degrees. At that time the proper 135 c./s. pulse and the main reference pulse tend to coincide. Also, for bearings approaching 360°, the main reference pulse may occur prior to the transfer of the counter reading. Since the counter delay flip-flop 84 and the counter control flip-flop 82 are reset together, and since the counter delay flip-flop 84 is not set until after the counter 70 is reset, the main reference pulse cannot start the counter 70 during the next cycle until the count is transferred from the counter 70 to the storage register 74.

It will also be apparent that the phase advance of the 15 c./s. pulse insures that the proper 135 c./s. pulse is selected for control of the counter since 135 c./s. pulses occupy no more than a forty degree portion of the 15 c./s. pulse.

When the computation system is conditioned for coarse operation only, the 15 c./s. pulses are used to stop the counter. Accordingly, the phase shift network is short-circuited and the count is controlled exclusively in accordance with the phase relationship between the main reference pulses and the 15 c./s. pulses.

The accuracy of the computation and the feasibility of the use of the 135 c./s. pulses and the main reference pulses in the computation may be more clearly understood from the following discussion. The time and phase $\phi$ of the sine wave have the following relationships:

$$\phi = 2\pi \text{ ft. in radians} \quad (1)$$

or $$\phi = 2\pi \text{ ft.} \times \frac{360}{2\pi} = 360 \text{ ft. in degrees} \quad (2)$$

Therefore the phase angle of the 15 c./s. wave with respect to the main reference pulse can be calculated in terms of the time interval between the main reference pulse and the 15 c./s. cross-over pulse immediately succeeding that main reference pulse. If the counter 70 is started with the main reference pulse and stopped with the 15 c./s. pulse, the total count will be:

$$N = F_c t \quad (F_c = \text{clock frequency}) \quad (3)$$

Therefore:

$$t = N/F_c \quad (4)$$

and $$\phi_{15} = 360 \text{ ft.} = 360 fN/F_c \quad (5)$$

For the 15 c./s. information, the bearing angle $\theta$ is equal to the electrical phase angle, therefore:

$$\theta = \phi_{15} = \frac{360 \times 15 \times N}{F_c} \quad (6)$$

In order to compute the phase angle $\theta$ in tenths of degrees, the counter 70 should receive clock pulses having a frequency ten times higher than if the phase angle were computed in degrees. This clock pulse frequency may be determined by the following relationship:

$$\theta = \frac{N}{10} = \frac{360 \times 15 N}{F_c} \quad (7)$$

The clock frequency may therefore be calculated as follows:

$$F_c = 10 \times 360 \times 15 = 54,000 \text{ c./s.} \quad (8)$$

Since the electrical phase of the 135 c./s. wave changes 360 degrees for every 40 degree change in bearing, the total phase of the 135 c./s. wave with respect to the main reference pulse is:

$$\phi_{135} = 9\theta \quad (9)$$

and $$\theta = \phi_{135}/9 \quad (10)$$

Accordingly, the total 135 c./s. phase angle is computed by the count in the counter in the time interval between the main reference pulse and the 135 c./s. pulse which occurs nearest the 15 c./s. which immediately follows the main reference pulse. From the previously developed relationships:

$$\phi_{135} = \frac{360 fN}{F_c} = \frac{360 \times 135 \times N}{F_c} \quad (11)$$

and $$\theta = \frac{\phi_{135}}{9} = \frac{360 \times 135 \times N}{9 \times F_c} = \frac{360 \times 15 \times N}{F_c} \quad (12)$$

It will be observed that Equation 12 is the same as Equation 7 (viz. bearing is calculable from the 135 c./s. information as it is from the 15 c./s. information but to much higher accuracy). Accordingly, the same clock frequency is used for both calculations. For example, $F_c = 54,000$, and the bearing angle $\theta = N/10$.

From the foregoing description it will be apparent that there has been provided an improved system bearing computer especially suited for use in TACAN equipment. It will be appreciated that other uses for the computer, as in other navigation systems, as well as variations in and modifications of the system will become apparent to those skilled in the art. Accordingly, the foregoing description should be taken merely as illustrative and not in any limiting sense.

What is claimed is:

1. A system for computing the bearing of a receiving station with respect to a transmitting station which transmits a reference signal and a pair of harmonically related signals, the phase of which with respect to said reference signal at said receiving station being a function of said bearing, said system comprising,
    (a) means at said receiving station responsive to said reference signal and said pair of harmonically related signals for providing first signals corresponding to said reference signal, second signals corresponding to one of said pair of harmonically related signals having the same frequency as said reference signals, and third signals corresponding to the other of said pair of harmonically related signals having a frequency which is a multiple of the frequency of said second signal, and
    (b) means for computing said bearing as a function of the length of time intervals between said first signals and the ones of said third signals which immediately succeed the ones of said second signals which immediately follow said first signal.

2. A system for computing the bearing of a receiving station with respect to a transmitting station which transmits a reference signal pulse and first and second signals which are harmonically related to each other, the phase relationship between said reference signal and said first and second signal at said receiving station being a function of said bearing, said system comprising
    (a) means for producing in response to said first and second signals, first and second signal pulses which occur repetitively at the same phase position in the cycles of said first and second signals, respectively,
    (b) means for repetitively providing digital numbers, each having a value corresponding to the time interval between successive ones of said reference signal pulse and the ones of said second signal pulses next following the ones of said first signal pulse which occurs immediately after said reference signal pulse, and
    (c) means for utilizing said numbers to indicate said bearing.

3. A system for computing the bearing of a receiving station with respect to a transmitting station which transmits a repetitive reference signal and a pair of signals, one of which has a fundamental frequency equal to the repetition rate of said reference signal, and the other of which has a frequency which is a harmonic of the frequency of said fundamental signal, said system comprising
    (a) means for detecting when said fundamental signal reaches a predetermined phase position in each cycle thereof for producing first pulses in response thereto,
    (b) means for detecting when said harmonic signal reaches a predetermined phase position in each cycle thereof for producing second pulses in response thereto,
    (c) a source of clock pulses,
    (d) means controlled by said reference signals, said first pulses and said second pulses, for repetitively providing counts of the number of said clock pulses which occur between each of said reference signals and the one of said second pulses which immediately follows the one of said first pulses which immediately follows each of said reference signals, and
    (e) means for providing an indication of said bearing in accordance with the value of said number.

4. The invention as set forth in claim 3, wherein at least one of said detecting means includes means for providing said first pulses at a phase position in the cycle of said fundamental wave which is advanced with respect to the phase position in the cycle of said harmonic wave at which said second pulses are provided.

5. The invention as set forth in claim 4 wherein said means for providing counts includes
   (a) a counter,
   (b) means operative when enabled to apply said clock pulses to said counter,
   (c) means responsive to said reference signals for enabling said last-named means and to said second signals for inhibiting said last-named means, and
   (d) means operated by said first signals for inhibiting operation of the means specified by subparagraph (c) of this claim 5 until occurence of one of said first signals.

6. The invention as set forth in claim 5 wherein
   (a) said means operative when enabled for applying said clock pulses to said counter is an AND gate, and wherein
   (b) said means responsive to said reference signal and said second signal includes
       (i) a flip-flop, having said reference signals applied to one input thereof for setting said flip-flop in one of said states, said flip-flop having its output connected to said AND gate for enabling said AND gate when set,
       (ii) another AND gate having its output connected to another input of said flip-flop, said other AND gate having said second pulses applied thereto for resetting said first-named flip-flop into the other of its states, when one of said second pulses occurs and said other AND gate is enabled, and wherein
   (c) said means operated by said first signals includes
       (i) a second flip-flop adapted to receive said first signals at an input thereof for setting said second flip-flop and having an output connected to said other AND gate for enabling said other AND gate when said second flip-flop is set.

7. The invention as set forth in claim 6, including
   (a) a third flip-flop having an output coupled to an input of said first AND gate for conditioning said gate to be enabled when said third flip-flop is set,
   (b) delay means for applying the output of said other AND gate to reset said counter and to set said third flip-flop upon occurrence thereof, and
   (c) means for applying said output of said other AND gate to said third flip-flop for resetting said third flip-flop.

8. The invention as set forth in claim 5, including
   (a) a register,
   (b) means operated by said second signal for resetting said register simultaneously with inhibition of said means for applying said clock pulses to said counter, and
   (c) gate means for transferring the count from said counter to said register after a predetermined delay and said register is reset.

9. The invention as set forth in claim 8, including
   (a) signal operated means for displaying said bearing, and
   (b) means responsive to the count in said register for deriving a signal to operate said displaying means.

10. In a TACAN receiver which receives from a beacon a signal including a repetitive reference pulse, a fundamental wave having the same frequency as said reference pulse, and a wave which is a harmonic of said fundamental wave, a system for computing the bearing of said receiver with respect to said beacon comprising
    (a) a first filter responsive to the received beacon signal for deriving said fundamental wave therefrom,
    (b) a second filter responsive to the received beacon signal for deriving said harmonic wave therefrom,
    (c) phase shift means coupled to at least one of said filters for advancing the phase of said fundamental wave an amount approximately equal to one half cycle of said harmonic wave,
    (d) detection means responsive to said harmonic wave and said phase shifted fundamental wave for deriving first and second pulses at like phase positions in the cycle thereof,
    (e) a source of clock pulses,
    (f) means controlled by said reference signals, said first pulses and said second pulses, for repetitively providing the count of the number of said clock pulses which occur between each of said reference signals and one of said second pulses which immediately follows the one of said first pulses which immediately follows said each reference signal, and
    (g) means for providing an indication of said bearing in accordance with the value of said number.

11. A system for computing the bearing of a receiving station with respect to a transmitting station which produces signals, the phase relation between which at said receiving station is a function of said bearing, said system comprising
    (a) means for producing in response to said signals, signal pulses, each corresponding to a different one of said signals, which repetitively occur at the same phase position in the cycle of their corresponding signals,
    (b) means for providing clock pulses which correspond in frequency to the frequency of one of said signals,
    (c) means controlled by said signal pulses for providing outputs corresponding to the count of said clock pulses which occur during the intervals, starting with one of said signal pulses and terminating with the other of said signal pulses, said outputs being indicative of said bearing, and
    (d) wherein said means for providing clock pulses includes
        (i) a variable frequency oscillation generator for producing said clock pulses at a frequency approximately equal to a higher harmonic of said frequency of said one of said signals,
        (ii) means responsive to said clock pulses and said one signal for deriving an error signal which is a function of the frequency difference therebetween, and
        (iii) means for controlling the frequency of said generator in response to said error signals so as to reduce said frequency difference.

12. The invention according to claim 11 wherein said means for deriving said error signal is also responsive to the phase difference between the pulses and signals applied thereto so that said clock signals are locked in phase with said one signals.

13. The invention as set forth in claim 11 wherein said error signal responsive means includes
    (a) a frequency divider coupled to said generator for dividing the frequency thereof so that the frequency of said clock pulses and said one signal are of the same order of magnitude,
    (b) a first flip-flop,
    (c) a second flip-flop,
    (d) logic circuitry responsive to the state of said flip-flops, said one signals and said divided clock pulses operative to condition said first flip-flop into one of its two states when said one signals precede said divided clock pulses and to condition said second flip-flop into one of its two states where said divided clock pulses precede said one signals, and
    (e) means coupled to at least one of said flip-flops and responsive to the output thereof for deriving, as said error signal, a voltage having a sense depending on the state of said last-named flip-flop and a magnitude depending upon the time interval during which said last-named flip-flop is in the same one of its states.

14. The invention as set forth in claim 13 wherein said logic circuitry includes
   (a) first and second AND gates coupled through a first OR gate to a trigger input of said first flip-flop,
   (b) third and fourth AND gates coupled through a second OR gate to a trigger input of said second flip-flop,
   (c) means for enabling said second AND gate with said one signals, when said flip-flops both are in one of their two states,
   (d) means for enabling said third AND gate with said divided clock pulses when said flip-flops both are in said one of their said two states,
   (e) means for enabling said first AND gate with said one signals when said first flip-flop is in the other of its said two states, and
   (f) means for enabling said fourth AND gate with said divided clock pulses when said second flip-flop is in said other of its said two states.

15. A system for computing the bearing of a receiving station with respect to a transmitting station which transmits a reference signal indicative of a reference bearing and first and second signals which are harmonically related to each other, the second of which being of higher frequency than the first and the phase of which with respect to said reference signal is a measure of the bearing of said receiving station with respect to said transmitting station, said system comprising
   (a) means for generating clock pulses having a frequency very much higher than the frequency of said first and second signals,
   (b) a counter responsive to said clock pulses for counting said pulses, and
   (c) means operated by said reference pulses and said first and second signals for reading out of said counter the number of pulses which occur between each of the ones of said second signals immediately succeeding each of said first signals and each of said reference signals.

16. The invention as set forth in claim 15 including means responsive to said second signals for phase locking said clock pulses to said second signals.

17. The invention as set forth in claim 16 wherein said generating means provides said clock pulses with a frequency which is a still higher harmonic of said first signal than said second signal.

18. The invention as set forth in claim 17 wherein said clock pulse frequency is an integral multiple of 360.

19. The invention according to claim 15 including
   (a) means for storing the counts in said counter, and
   (b) means responsive to said second signal for resetting said storing means.

20. The invention as set forth in claim 19 including
   (a) display means for indicating said bearing, and
   (b) means for transferring the counts stored in said storage means to said display means for operating said display means.

21. The invention according to claim 15 wherein said reading out means includes
   (a) a storage register,
   (b) means for transferring the count contained in said counter to said register when enabled, and
   (c) means operated by said second signal for resetting said counter, thereafter enabling said transferring means, and yet thereafter resetting said counter.

References Cited

UNITED STATES PATENTS

| | | | |
|---|---|---|---|
| 2,661,467 | 12/1953 | Jones | 343—106 |
| 2,938,205 | 5/1960 | Mandel | 343—106 |
| 3,209,254 | 9/1965 | Hossmann | 324—83 |

RODNEY D. BENNETT, *Primary Examiner.*

CHESTER L. JUSTUS, *Examiner.*

H. C. WAMSLEY, *Assistant Examiner.*